July 3, 1928.

T. A. BEANEY 1,675,875

MACHINE FOR CUTTING OFF AND SKIVING STOCK

Filed March 7, 1925     5 Sheets-Sheet 1

Inventor,
Thomas A. Beaney,
By his Attorney,
Ramsey Hoguet.

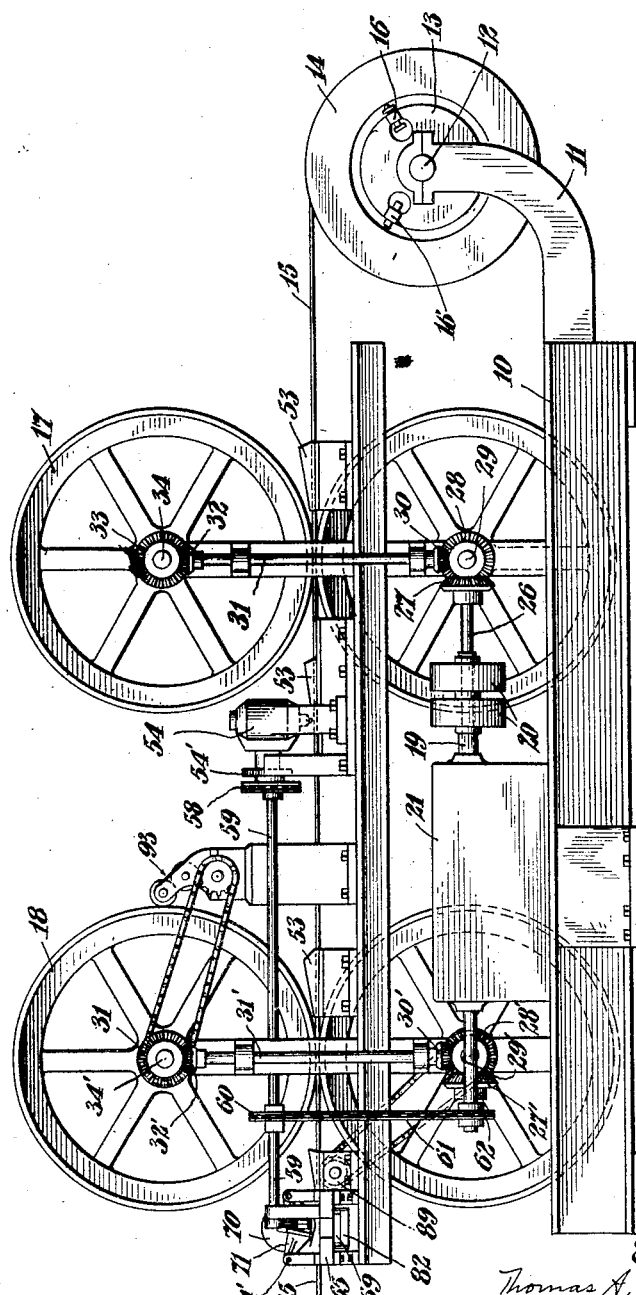

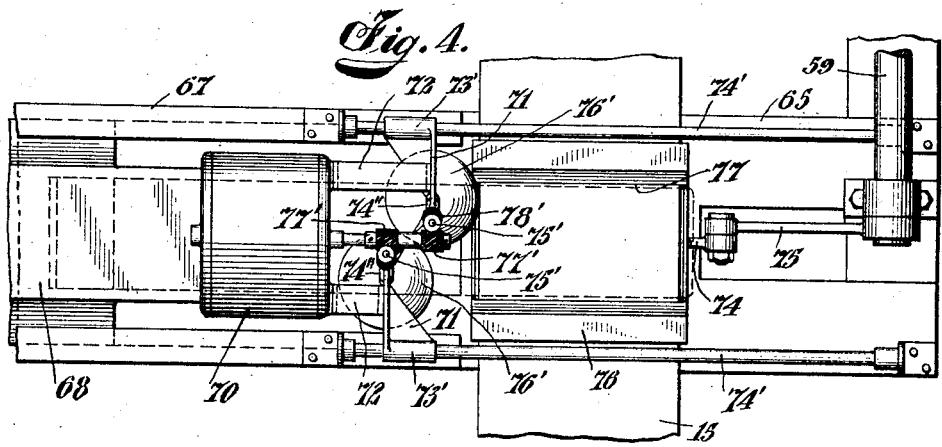
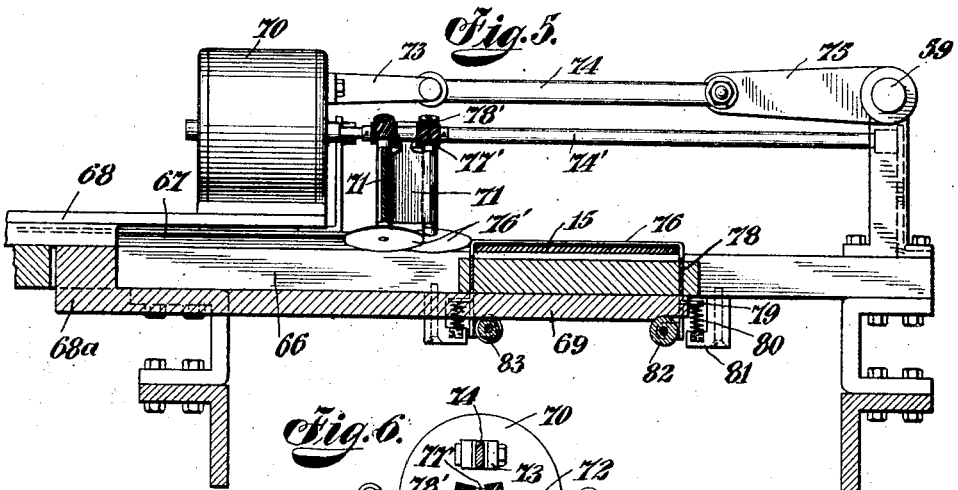
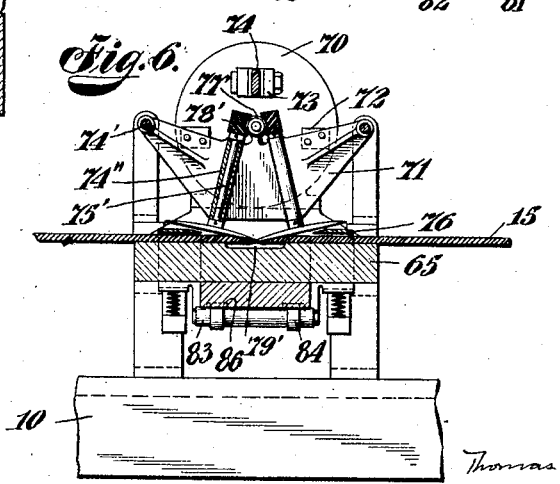

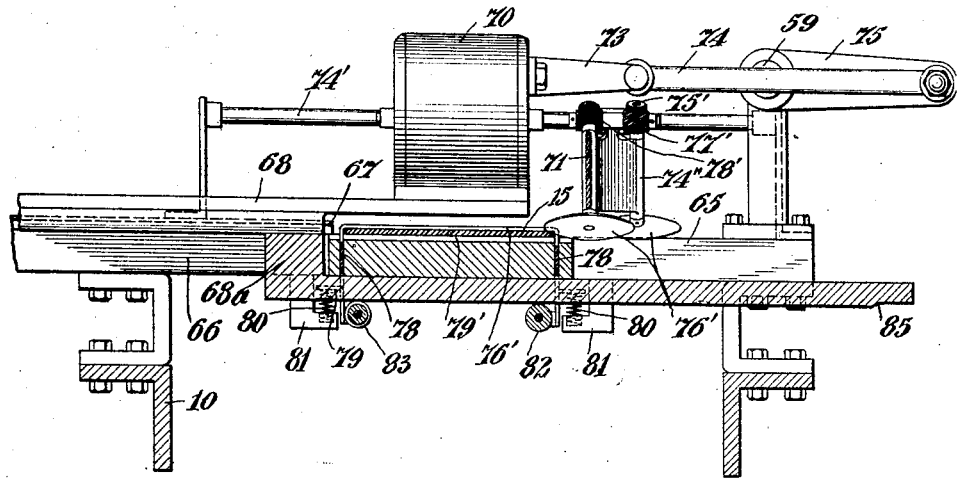
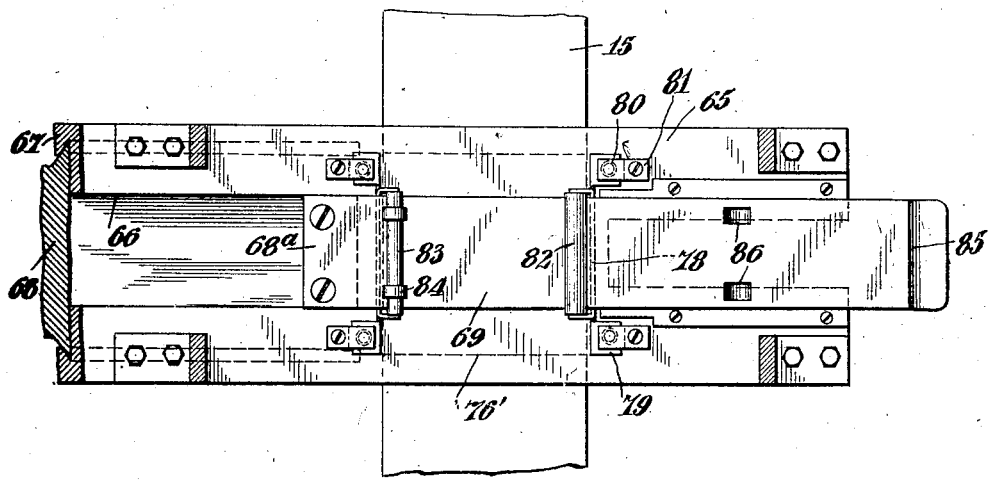

Patented July 3, 1928.

1,675,875

UNITED STATES PATENT OFFICE.

THOMAS ARTHUR BEANEY, OF POUGHKEEPSIE, NEW YORK, ASSIGNOR TO BEANEY RUBBER COMPANY INC., OF NEW YORK, N. Y., A CORPORATION OF NEW YORK.

MACHINE FOR CUTTING OFF AND SKIVING STOCK.

Application filed March 7, 1925, Serial No. 13,777, and in Canada February 23, 1925.

My invention relates to improvements in machines adapted to cut off long lengths of stock into desired lengths, and at the same time perform operations on the severed parts which will prepare them for use. My invention is particularly adapted to cut stock into strips for making tire flaps which lie between the inner tube and outer tire for vehicle wheels, and this particular invention is an improvement on the machine for which I have applied for Letters Patent of the United States Serial No. 723,612, filed July 2nd, 1924. My prior machine functions in a manner similar to my present invention, but the improvement lies particularly in the means for cutting off the stock into strips and skiving the end portions of the stock near the line of severance. This is a difficult thing to do nicely, particularly on the kind of material which is used for tire flaps, but my improvement has been used successfully and is adapted for cutting off and skiving other kinds of stock and strips for other purposes than tire flaps. In the improvement I show means for holding the stock flat at intervals, and while the stock is at rest a transverse cutter comprising discs which actually skive or thin the stock moves quickly across it, and cleanly cuts and skives it as specified.

Reference is to be had to the accompanying drawings forming a part of this specification, in which similar reference characters indicate corresponding parts in all the views.

Figure 3 is a rear elevation of the machine.

Figure 4 is an enlarged detail plan of the cut-off mechanism showing the cutter in the act of engaging the stock.

Figure 5 is an enlarged cross sectional elevation on the line 5—5 of Figure 4.

Figure 6 is a cross section on the line 6—6 of Figure 5.

Figure 7 is a view similar to Figure 5 but showing the cutter in the act of leaving the stock.

Figure 8 is a view on the line 8—8 of Figure 7, looking up, and

Figure 9 is a detail of one of the mutilated gears of the adjustable drive.

Figure 1:
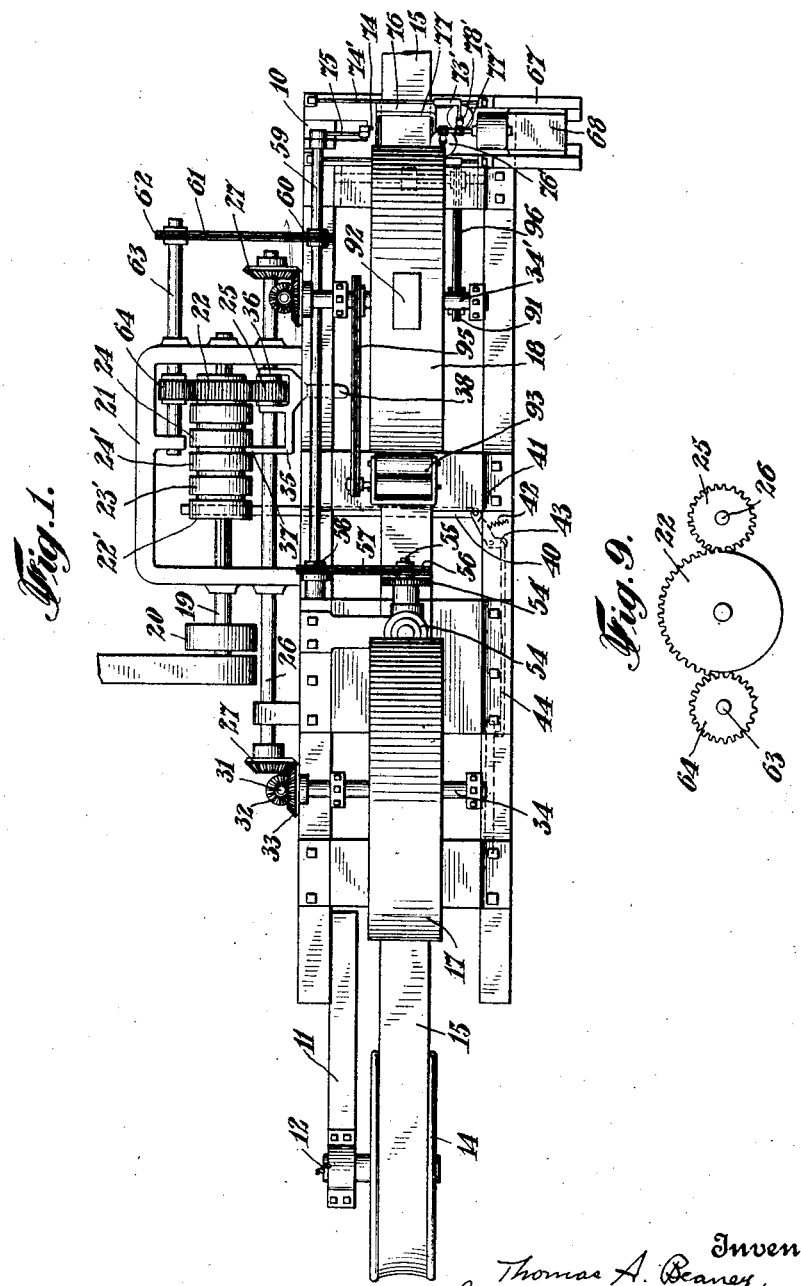
Figure 1 is a plan view of the machine showing my improvements.

The machine is provided with a suitable frame 10 which can be of any design capable of carrying the operating parts, and at one end has preferably a bracket 11 at the upper end of which is journaled a stud 12 carrying the roller 13 on which is placed a drum 14 which carries the long stock strip 15 from which the flaps are prepared. For the particular use referred to, rubberized cloth or canvas is generally used, and it comes on drums like the drum 14, and the roller 13 is adjusted with relation to the drum and so as to hold the drum correctly by means of the bolt attachments 16 which are carried by the roller and engage the inner wall of the drum. Obviously any usual or suitable means can be used for adjusting and tightening the drum on the roller, and likewise the drum might be supported independently from the machine, or the long stock strips might be fed to the machine in any suitable way without affecting the invention.

The stock in strip form is carried through the machine by the pairs of feed wheels 17 and 18 which are spaced apart horizontally and arranged one above the other vertically in a manner customary with feed wheels, and they have a uniform drive, but the wheels 18 are preferably slightly larger than the wheels 17 so as to hold the stock under tension while it is being printed on and punched, as hereinafter described. This is necessary because the stock is usually convex on one side and concave on the other, and in any event it has a tendency to curl and cannot be well operated on unless it is held taut and flat.

Figure 2:
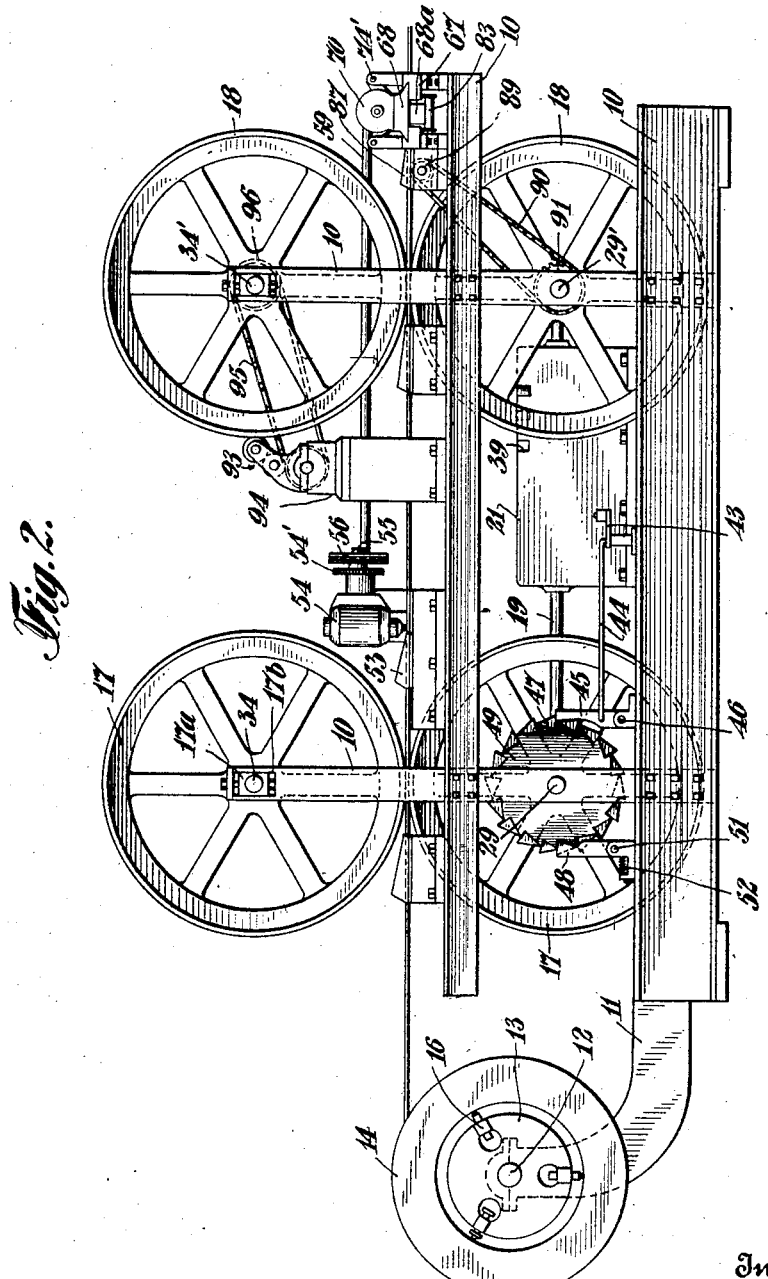
Figure 2 is a front elevation thereof.

The upper and lower feed wheels are preferably movable with relation to each other to provide for varying thicknesses of stock, and they are preferably driven from a common driving shaft to the end that they may be easily and nicely timed and simultaneously adjusted in their movements. This driving mechanism is shown in Figures 1, 2 and 3, and a convenient means of driving is shown, but without the intention of limiting the invention to this particular drive, though it is believed to be novel. The drive shaft 19 is driven by means of tight and loose pulleys 20 or other equivalent driving gear, and it enters the gear box 21 and has a plurality of mutilated driving gears 22, $22^1$, $23^1$ and $24^1$, although a greater or less number may be used. These gears have each teeth on one side and a plain surface on the other as shown in Figure 9, and the number of teeth varies to provide for driving the feed wheels a distance proportional to the flaps or stock strips to be cut off, as will presently appear. The gear 22 is shown connecting with a pinion 25 on the counter shaft 26 (see Figure 1) and this drives both pairs of feed wheels, the connection to the feed wheels 17 being by means of a bevel pinion 27, the bevel pinion 28 on the lower feed wheel shaft 29, the pinion 30, the vertical shaft 31, the pinion 32, and the pinion 33 on the upper shaft 34. This shaft is mounted in a box $17^a$ which slides on the shaft 31 and moves in a slot $17^b$ at the upper end of its support. The connection with the feed wheels 18 is exactly similar to that just described, and the corresponding parts are marked $27^1$, $28^1$, etc.

Thus it will be seen that both sets of feed wheels comprising the stock feed are similarly driven and must have the same movement. The pinion 25 is keyed to the shaft 26 and by moving it into connection with the desired drive gear 22, 23 or 24, which have different numbers of teeth, it will be seen that a greater or less movement, depending on the length of strip which is to be cut from the main stock strip, can be given to the feed wheels. To effect this movement a suitable shipper 35 is used, having a fork 36 to engage the pinion 25, and having an arm 37 to move the cams or gears $22^1$, $23^1$ and $24^1$, which have teeth on one side as described, and which are keyed to the shaft 19 as shown in Figure 1. This cam arrangement is not shown in detail as it is described in my prior application hereinabove referred to and is not here claimed. Thus when the gear 25 is moved into engagement with a desired mutilated drive, the corresponding cam will be similarly moved so as to engage its actuated mechanism which locks the feed wheels as presently described. It will be noticed by reference to Figure 9 that the feed wheels are at rest during half the rotation of one of the gears 22, 23 or 24, and during this idle moment of the feed the wheels are locked and the cutting and punching takes place. The shipper 35 has a suitable handle 38 which when turned down engages one of the notches 39 on the edge of the gear box 21 (see Figure 2) and holds the shipper and connected parts in place.

The rotating cams $22^1$, etc., actuate the lever 40 (see Figure 1) which in turn acts on a link 41 against the tension of a spring 42, and the link connects by means of a bell crank 43 (see Figures 1 and 2) with a rod 44 which is pivoted to the pawl 45, this in turn being pivoted to a suitable support 46 and arranged to engage the notches 47 on a locking wheel 49 attached to the shaft 29. On the opposite side of the locking wheel is a pawl 48 acting as a detent, this being pivoted as shown at 51 and held against the wheel 49 by a spring 52. There are preferably as many teeth 47 on the wheel 49 as there are teeth on the driving pinion 25, so that whenever the feed wheels stop, the pawls 45 and 48 will engage in their respective notches and lock the wheels against forward movement by momentum or backwards. I have shown this locking arrangement connected to one of the feed wheels, but in practice I prefer to connect it with both sets of feed wheels so as to distribute the strain, and this connection could be like that indicated, or other locking means might be used.

As the stock is fed through the machine, it passes through suitable guiding devices 53 and is punched at appropriate distances by the punch 54 which is not shown in detail, but which can be any approved type of punch having an adjusting device $54^1$ and being arranged to punch a hole through the strip so that a valve stem or the like can be inserted and no subsequent punching will be required. The punch can be actuated during the interval that the feed is at rest, and can be driven in any suitable manner. As shown it has a stud 55 driven by a sprocket wheel 56, and this connects by a chain 57 with a sprocket wheel 58 on the shaft 59 which is suitably mounted on the machine frame parallel with the shaft 63 from which it is driven, the connection being by means of the sprocket wheel 60, chain belt 61 and sprocket wheel 62. It will be seen that when the teeth of one of the mutilated gears 22, $22^1$, $23^1$, etc., engages the pinion to drive the feed wheels, the plain face of the said gear will be opposite the pinion 64, and so the punch will not be operated; but when the plain face of the gear is opposite the pinion 25, the teeth will engage the pinion 64 and operate the punch.

After leaving the feed wheels 18, the stock strip 15 passes over a bed 65, which is supported on the main frame and which is slotted as shown at 66 in Figure 5, and is provided with a transverse slideway in which a slide 68 moves transversely, this slide having a part $68^a$ moving in the slot 66 and having on the under side an extension 69, as shown in Figures 5, 7 and 8. A power source, such as a motor 70, is mounted on the slide 68 and carries a pair of brackets 71 on the arms 72. These brackets are provided with guide sleeves $73^1$ which operate on rods $74^1$ supported on the bed of the machine, so that during the movement of the slide 68 the brackets will be guided in their movement. These brackets are provided with bearings $74^{11}$ in which shafts $75^1$ operate. These shafts diverge downwardly and carry circular cutters $76^1$ at their lower ends, the cutters of course being attached to the downwardly diverging shafts, diverge upwardly and are staggered as shown in Figure 4, and yet their paths of travel overlap, that is to say a tangent of one cutter parallel to the line of movement of the cutters becomes a chord of the other cutter. The shafts, and consequently the cutters 76¹, are driven by the power unit 70, and when this is in the form of a motor, the driving is accomplished by operatively connecting the armature shaft of the motor to the shafts 75¹. This may be done by providing the armature shafts with worms 77¹, and the shafts 75¹ with worm wheels 78¹. Thus it will be seen that as the slide 68 moves and the motor 70 is actuated, the cutters 76¹ will travel across the strip 15 and the rotation of the cutters during the travel will cause the skiving of the strip, the skiving of one edge being in advance of the skiving of the other edge because of the staggered relation of the cutters.

It is of course to be understood that it is not necessary to use two cutters, for one may be used, and in this event the cutting through of the strip will produce reverse skivings, as is obvious. In order that the cutters may completely sever the strip in the skiving operation, the slide 68 is provided with a depression 79¹ beneath the point where the cutters contact with the strip.

The skiving device by which the stock is skived and severed, is reciprocated transversely of the strip stock by means of a pitman 74, which connects a stud 73 on the slide 68 with the crank 75 on the shaft 59, so that the same shaft simultaneously moves the cut off device backwardly and forwardly across the stock and actuates the punch 54 so that the movement of these elements will be synchronized.

As previously remarked, the stock while being punched is held under tension by reason of the difference in diameter of the wheels 17 and 18, but at the point where it is cut off it has passed the last pair of feed wheels 18, and therefore a separate tension device is necessary. To this end I provide a presser foot 76 having a slight vertical movement which will hold the stock automatically very flat and tight so that it can be smoothly cut. This presser foot has an opening in the top as shown at 77 for the passage of the cutters 76¹, and it has opposite side portions turned down as shown at 78 and extended through the bed 65, these parts 78 having abutments 79 thereon which are normally pressed up by springs 80 supported in hangers 81 on the under side of the bed, and which raise the presser foot so that the stock 15 can pass smoothly beneath it during the forward feed of the stock. The presser foot is pulled down, however, at the time the stock is cut off by means of rollers 82 and 83 carried by the downwardly extended parts 78 (see Figure 5). When the slide 68 is moved to carry the cutters 76¹ across the stock, the extension 69 engages the rollers 82 and 83 and pulls the presser foot down so as to hold it firmly upon the stock. When, however, the cutter is retracted and the stock is to be fed forward, the springs 80 lift the presser foot 70 and the roller 82 rests in the groove 85 of the extension 69, while the enlarged parts 84 of the roller 83 enter the recess 86 (see Figure 8) of the extension 69, thus permitting the upward movement of the presser foot.

A feed roll 89 acting against a suitable abutment 87 is also used to carry forward the stock 15 after it has left the feed wheels 18. This feed roller 89 can be operated in any convenient way, as for instance by a chain belt 90 connecting with a sprocket wheel 91 of the shaft 29¹ (see Figure 2).

It is desirable to print on the formed flaps or stock strips, and to this end one of the feed wheels, as for instance the feed wheel 18, is provided with type 92, which can represent the directions for using the flap, the name of the maker, or other matter, and in connection with this is an ordinary inking arrangement comprising the inking rolls 93 mounted on a suitable support 94 and driven by a chain belt 95 connecting with the sprocket wheel 96 on the shaft 34¹. Obviously any suitable printing mechanism or inking mechanism can be substituted for that shown.

When the machine is to be used, the stock 15 which is usually on a drum 14, is threaded through the guiding device 53, and we will assume that it is advanced to the position where the end has been cut off by the cutters 76¹. At this moment the cutter will be in the position shown in Figure 5, the presser foot 76 will be raised as shown in the same figure to permit the passage of the stock 15 through it, and the gear 22 or similar gear will be in engagement with the pinion 25, so that the first action is to turn the counter shaft 26 and the feed wheels. While this driving connection with the feed wheels remains they will advance the stock a distance corresponding to the length of a flap to be made. At this moment the gear 22 will have ceased to engage the pinion 25, but will engage the pinion 64, and so turn the shaft 59. This actuates the punch 54 to punch a hole through the stock, and will also through the instrumentality of the crank 75 and pitman 74 move the slide 68 forward and back, this action cutting off the stock and shaping both ends of adjacent flaps or strips as already described, and the operation is repeated automatically. It will be noted that when the stock is advanced the printing will be effected, and the printing attachment may or may not be used as desired.

From the foregoing description it will be noted that it is only necessary to enter the long strip of stock in the machine, and that thereafter the work is automatic until the strip is used up, the parts being tensioned, printed upon, punched, and cut off ready for use. It will also be noted that the punch 54 might, so far as the operation of the machine is concerned, be any other instrument adapted to stamp or do other work upon the stock.

I claim:—

1. In a machine of the kind described, an intermittent stock feed, a presser foot movable back and forth substantially at right angles to the stock and arranged to hold the stock flat while the feed rests, and a cut-off device acting while the stock feed rests, and including a rotating disc cutter for severing the stock near the presser foot and skiving adjacent parts of the severed stock.

2. In a machine of the kind described, an intermittently acting stock feed to feed a stock strip lengthwise, a presser foot movable back and forth with relation to the stock, a slide movable transversely of the travel of the stock and arranged to actuate the presser foot, and a disc cutter to sever the stock.

3. In a machine of the kind described, an intermittent stock feed to feed a stock strip lengthwise, a slide movable transversely of the stock, a presser foot movable up and down with relation to the stock and arranged to hold the stock flat, and a disc cutter carried by the slide and shaped to sever the stock and skive the parts of the stock near the line of severance.

4. In a machine of the kind described, an intermittent stock feed for feeding a stock strip lengthwise, a presser foot movable up and down with relation to the stock and shaped to hold the stock flat, a slide movable transversely of the stock feed and arranged to actuate the presser foot, and a rotatable disc cutter carried by the slide at an angle to the stock and shaped to sever the stock and skive the adjacent parts.

5. In a machine of the kind described, means for moving strip stock intermittently, a presser foot movable up and down with relation to the stock and shaped to hold the stock flat while the feed rests, a cutter for severing and skiving the stock transversely, including a disc arranged in angular relation to the stock, means for rotating the disc, and automatic means for moving the disc transversely of the stock while the disc is being rotated and during the period of rest of the stock.

6. In a machine of the kind described, means for intermittently feeding strip stock, means for severing and skiving the stock including a pair of upwardly diverging disc cutters adapted to traverse the stock, means for rotating the cutters, and means for moving the cutters across the stock during the periods of rest of the stock.

7. In a machine of the class described, means for positioning a strip of stock, a cut-off device comprising a plurality of disc cutters of opposed pitch, means for moving the cut-off device across the stock, and means carried by the moving means for simultaneously rotating the disc cutters.

In testimony whereof, I have signed my name to this specification this 5th day of March, 1925.

THOMAS ARTHUR BEANEY.